United States Patent [19]
Barth et al.

[11] 3,954,365
[45] May 4, 1976

[54] APPARATUS FOR THE PREPARATION OF FOAMED THERMOPLASTIC EXTRUDED PROFILES

[75] Inventors: Hansjochen Barth, Emmerting; Johann Bauer, Burghausen, both of Germany

[73] Assignee: Wacker Chemie GmbH, Munich, Germany

[22] Filed: Oct. 31, 1974

[21] Appl. No.: 519,540

[30] Foreign Application Priority Data
Nov. 28, 1973  Germany............................ 2359282

[52] U.S. Cl.............................. 425/197; 264/45.9; 264/176 R; 425/376; 425/817 C
[51] Int. Cl.²......................................... B29D 7/02
[58] Field of Search ........... 425/197, 198, 199, 380, 425/466, 467, 4 C, 817 C, 376, 461, 377; 264/176 R, 45.9

[56] References Cited
UNITED STATES PATENTS

| | | |
|---|---|---|
| 1,159,489 | 11/1915 | Gammel.......................... 425/467 X |
| 1,397,571 | 11/1921 | Bowen ............................ 425/377 X |
| 3,079,634 | 3/1953 | Berger ................................. 425/461 |
| 3,413,387 | 11/1968 | Ohsol............................... 425/467 X |
| 3,427,371 | 2/1969 | Skinner............................ 425/4 C X |
| 3,447,203 | 6/1969 | Campbell............................. 425/466 |

FOREIGN PATENTS OR APPLICATIONS
441,093  2/1927  Germany ............................ 425/467

*Primary Examiner*—R. Spencer Annear
*Assistant Examiner*—Mark Rosenbaum
*Attorney, Agent, or Firm*—Hammond & Littell

[57] ABSTRACT

An apparatus for the production of extruded profiles of foamed thermoplasts consisting of an extruder having an extrusion screw or helix and a form-giving extruder head having a flow channel there-through, at least part of the length of said flow channel being divided by separating walls having a thickness of 0.2 to 3 mm arranged in the axial direction into individual channels of such a length and cross-section area whereby each individual channel has a nozzle coefficient $k$ of from 0.1 to 2mm³, characterized in that thorn-like pins are inserted into some of the individual channels; as well as the process of extrusion.

5 Claims, 7 Drawing Figures

U.S. Patent  May 4, 1976  3,954,365
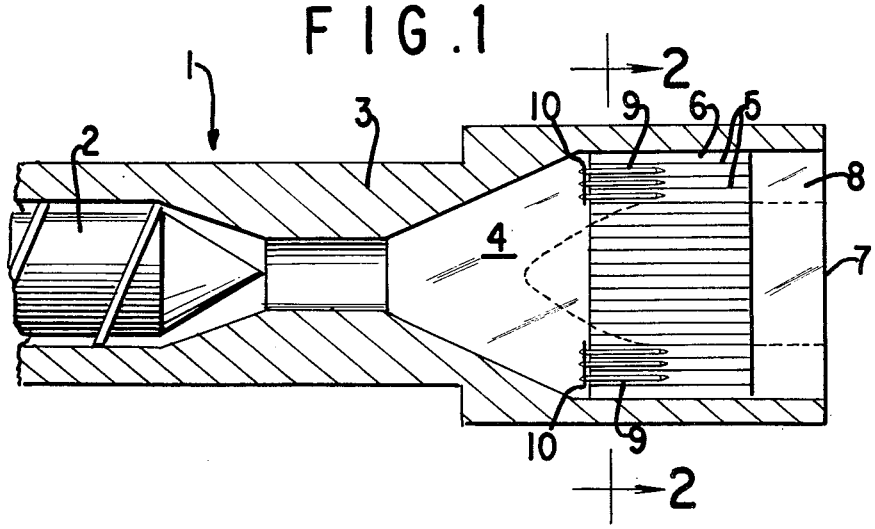
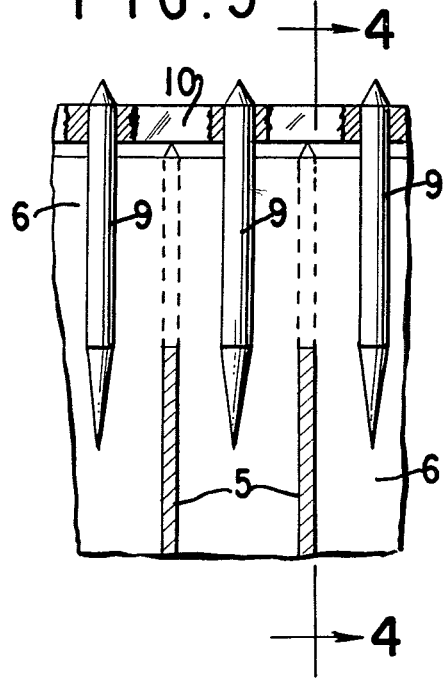
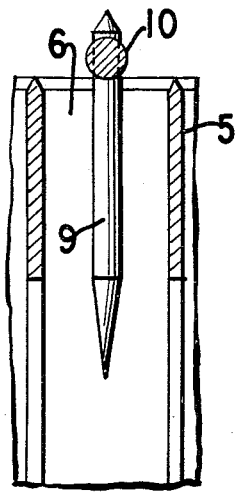
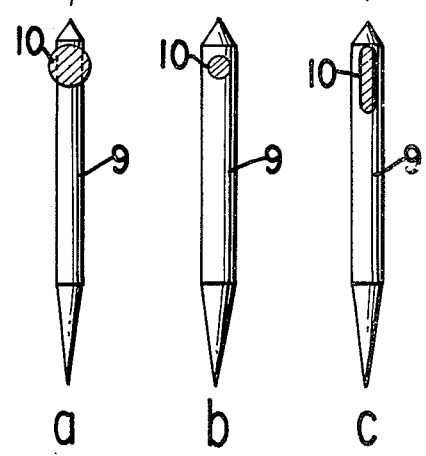
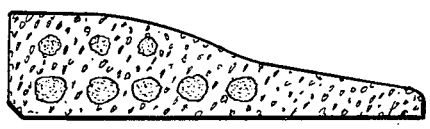
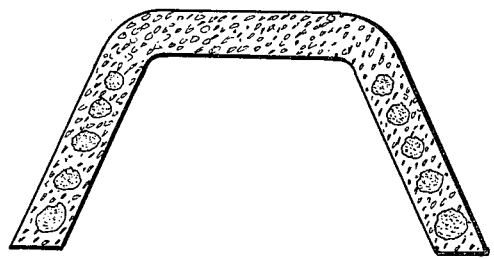

3,954,365

APPARATUS FOR THE PREPARATION OF FOAMED THERMOPLASTIC EXTRUDED PROFILES

THE PRIOR ART

It is known from U.S. patent application Ser. No. 404,506, filed Oct. 9, 1973 and commonly assigned with the instant application to provide a process for the manufacture of profiles made of foamable thermoplasts by means of an extruder, characterized in that the plastic thermoplast which contains foaming agents is extruded by means of an extruder helix through an extrusion head, the flow channel of which is divided in axial direction into individual channels by means of separating walls with a thickness of 0.2 to 3 mm, where each individual channel has a nozzle coefficient $k$ of from 0.1 to 2 mm$^3$, as well as an apparatus for the performance of this process consisting of an extruder 1 with a helix 2, and an extrusion head 3, characterized in that the entire length of the flow channel 4 or a portion thereof in the extrusion head 3 is divided by separating walls 5 with a thickness of 0.2 to 3 mm arranged in axial direction into individual channels 6, where each individual channel has a nozzle coefficient $k$ of from 0.1 to 2 mm$^3$.

This process and this apparatus make it possible to prepare profiles which have large cross sections with densities of 0.4 to 0.6 g/cm$^3$. However, the density across the cross section cannot be varied independently of the design of the individual channels. Moreover, in many cases, it is not easy to make adjustments for achieving a uniform flow front over the whole cross section.

Objects of the Invention

An object of the present invention is the development of an apparatus for the production of extruded profiles of foamed thermoplasts consisting of an extruder having an extrusion screw and a form-giving extruder head having a flow channel there-through, at least a part of the length of said flow channel being divided by separating walls having a thickness of 0.2 to 3 mm arranged in the axial direction into individual channels of such a length and cross-section area whereby each individual channel has a nozzle coefficient $k$ from 0.1 to 2 mm$^3$, characterized in that thorn-like pins are inserted into some of the individual channels.

A further object of the present invention is the development of a process for the production of extruded profiles of foamed thermoplasts which consists of extruding a foamable thermoplastic mixture through a narrow orifice into a zone divided into a plurality of individual channels defined by separatory walls arranged in an axial direction with a thickness of between 0.2 and 3 mm, where each of said individual channels has a flow cross section and has a nozzle coefficient $k$ of from 0.1 to 2 mm$^3$, foaming said foamable thermoplastic mixture and recovering an extruded profile of foamed thermoplasts, characterized in that the flow cross section of some of the individual channels is reduced by thorn-like pin-shaped zones positioned in said channels.

These and other objects of the invention will become more apparent as the description thereof proceeds.

THE DRAWINGS

FIG. 1 is a cross-sectional top view of the embodiment of the extruder of the invention.

FIG. 2 is a cross-section of an arrangement of the throttle lattices and thorn-like pins of the invention for the flow channel of the extruder of FIG. 1.

FIG. 3 shows thorn-like pins positioned in the throttle lattices of the invention.

FIG. 4 shows a section view along line 4—4 of FIG. 3.

FIG. 5 shows various embodiments for connecting the thorn-like pins to the throttle lattices of the invention.

FIGS. 6 and 7 show examples of profiles produced according to the invention.

DESCRIPTION OF THE INVENTION

The subject matter of this invention is a process for the manufacture of profiles made of foamable thermoplasts by means of an extruder, in which the plastic thermoplast which contains foaming agents is extruded by means of an extruder helix through an extrusion head, the flow channel of which is divided in axial direction into individual channels by means of separating walls with a thickness of 0.2 to 3 mm, where each individual channel has a flow cross-section and has a nozzle coefficient $k$ of from 0.1 to 2 mm$^3$, characterized in that the flow cross-section of some of the individual channels is reduced by thorn-like pin-shaped zones positioned within said channels; as well as an apparatus for the performance of this process consisting of an extruder 1 with a helix 2, and an extrusion head 3, in which the entire length of the flow channel 4 or a portion thereof in the extrusion head 3 is divided by separating walls 5 with a thickness of 0.2 to 3 mm arranged in axial direction into individual channels 6, where each individual channel has a nozzle coefficient k of from 0.1 to 2 mm$^3$, characterized in that thorn-like pins are inserted into some of the individual channels.

Mor particularly, the present invention provides a process for the production of extruded profiles of foamed thermoplasts which consists essentially of extruding a foamable thermoplastic mixture through a narrow orifice into a zone divided into a plurality of individual channels defined by separatory walls arranged in an axial direction with a thickness of between 0.2 and 3 mm, each of said individual channels having a flow cross-section and having a nozzle coefficient $k$ of from 0.1 to 2 mm$^3$, positioning a thorn-like pin-shaped zone in some of said plurality of individual channels for reducing said flow cross-section of said individual channels, foaming said foamable thermoplastic mixture and recovering an extruded profile of foamed thermoplasts.

In addition the present invention more particularly provides an apparatus for the production of extruded profiles of foamed thermoplasts consisting essentially of an extruder having an extrusion helix and a form-giving extrusion head having a flow channel therethrough, at least part of the length of said flow channel being divided by separating walls having a thickness of 0.2 to 3 mm arranged in the axial direction into individual channels of such a length and flow cross-section area that each individual channel has a nozzle coefficient $k$ of from 0.1 to 2 mm$^3$, forming a throttle lattice and thorn-like pins positioned in some of said individual channels to reduce the flow cross-seciton area of said individual channels.

The process and apparatus of the invention have the advantages of making it possible in certain regions of the profile to further reduce the density of the profile in certain regions therein in a simple manner. This reduction is accomplished by the insertion of the thorn-like pins in the regions of the individual channels in which the density is to be reduced. This method is of special importance in the case of profiles which, for example, have large wall thicknesses because of decorative reasons. The thorn-like pins are mostly inserted into individual channels which lie in the interior of the profile so that a "reduction" of the interior of the profile results (see, for example, FIGS. 6 and 7). Other parts of the profile having a low density can be likewise produced when the thorn-like pins are inserted in the respective individual channels.

An additional advantage of the use of thorn-like pins is that the flow front of the total profile can be changed in a simple manner and that thus, the flow front can be optimized if necessary. Fundamentally, the flow front can also be influenced by a change in the height of the cross section or in the length of the individual channels. However, it is often easier to effect these changes by the insertion of the thorn-like pins.

The thorn-like pins can have many embodiments, of which the round shape embodiment is preferred. It is also possible to use angular shaped pins, for example, such pins which are similar or equal to the cross sections of the individual channels. Mostly, both ends of the pin are conical, and the center is cylindrical (see FIGS. 3 to 5). Other forms can also be employed. The diameter of the thorn-like pins is so chosen that the distance between the surface of the pins and the inner walls of the individual channels is between 0.2 to 5 mm. The thorn-like pins within an extruder head may have diameters of variable size. In particular, the length of the thorn-like pins amounts to 0.1 to 1.5 times the length of the individual channels within the throttle lattice. The length of individual thorn-like pins in the throttle lattice may vary.

In general, the pins are interconnected with each other by tie rods and are secured in position by them, because the tie rods are mounted on the ends of the individual sections of the throttle lattice. Within the throttle lattice itself, the thorn-like pins position themselves in their length in the center of the individual channels. The number of pins may vary within wide limits. It depends solely upon the desired reduction of thickness; that is if molded pieces having lower density are intended, a greater number of pins have to be inserted. In general, not more than 95% of all of the individual channels and not less than 5% of all the individual channels are provided with pins.

The throttle lattice and the remaining parts of the total apparatus are described in said U.S. patent application Ser. No. 404,506. In addition the process for preparing a suitable composition of the customarily used foam masses are described in this application. An extruded profile according to the present invention differs from the extruder profile described in the said Ser. No. 404,506. The difference consists in that cavities are formed in the individual channels by the thorn-like pins which cavities are closed up again in passage through the compression zone (not shown). Thus the pins cause the formation of regions having lower density.

FIG. 1 corresponds to FIG. 1 of said copending U.S. patent application Ser. No. 404,506, except that the thorn-like pins are designated as 9. In accordance with said copending application, the other numbers have the following meaning:

| | Throttle |
|---|---|
| 1 = Extruder | 5 = Lattice or Separating Walls |
| 2 = Helix | 6 = Individual Channel |
| 3 = Extrusion Head | 7 = Nozzle Mouth |
| 4 = Flow Channel | 8 = Joining Zone |

FIG. 2 shows a section through the throttle lattice 5. It can be clearly seen that the thorn-like pins are inserted in the region in which the profile is especially thick.

FIG. 3 shows the arrangement of the thorns in the throttle lattice depicted on an enlarged scale. FIG. 4 shows a section view of FIG. 3 along line 4—4. The individual thorns 9 protrude into the individual channels 6 which are formed by the walls of the throttle lattice 5. The thorns on both sides are conically tapered at both ends in the direction of the flow of the mass. The individual pins are secured in position by tie rods 10 which lie on the lattice faces. Within the throttle lattice, the thorn-like pins position themselves in their length in the center of the individual channels.

FIG. 5 shows various embodiments for the connection of the individual pins. These connections can be (a) larger than the pins in diameter as well as (b) smaller than the pins in diameter. They can also be shaped in longitudinal form according to the example shown in FIG. 5 (c).

The invention makes it possible to regulate the density within the profile cross section. If the diameter and the length of the individual pins within the extrusion head are uniformly maintained, then a uniform, but lower density can be maintained than would be obtainable without the use of the pins. A variation of the diameter and potentially, of the length of the individual pins within an extrusion head, makes possible further reduction of the density when larger and/or longer pins are inserted. The use of the thorn-like pins according to the invention renders the density independent of the resistance to flow in the respective channel.

Thus it is possible to reduce the density within those regions of the profile in which such a reduction is useful because of mechanical or practical reasons. The use of the above-described extrusion apparatus makes it possible to adjust the density in the outer regions of the profile to especially high values, and hence, to achieve a smooth surface. The density can then be reduced toward the interior to a greater extent. Thus the desired lower total density of the profile can be achieved, simultaneously with excellent mechanical properties being preserved.

FIGS. 6 and 7 show examples of profiles which can be advantageously manufactured by use of the process and apparatus of the invention. The insertion of pins having different diameters meets the requirements of producing a profile with as low a total density as possible, but while having a sufficient strength (for example bending strength or compressive strength) in zones exposed to high mechanical stress. Two different pin diameters were used in FIG. 6, and five different pin diameters in FIG. 7.

The following examples are merely illustrative of the present invention without being deemed limitative in any manner thereof.

EXAMPLE 1 (COMPARATIVE)

The extruder shown in FIGS. 1 and 2, but without pins, was used for extruding a foamable thermoplastic mixture which consisted of 100 parts by weight of PVC having a K-value of 65,
2 parts by weight of stabilizer,
1 part by weight of lubricant,
0.3 parts by weight of foaming agent, and
5 parts by weight of polyacrylate.

The individual channels have a cross section of 4.2 × 4.2 mm and a length of 60 mm. The nozzle coefficient of an individual channel was $k = 0.216$ mm$^3$. The density of the extruded profile was very uniform over the whole cross section. The total density was 0.68 g/ml. The surface of the profile was smooth.

EXAMPLE 2

The foamable mixture of Example 1 and the extruder shown in FIGS. 1 and 2, were utilized together with 10 thorn-like pins which had a diameter of 1.0 mm and a length of 40 mm. The pins were arranged according to FIG. 2 in individual channels having an inner clear width of 4.2 mm and a length of 60 mm whereby the nozzle coefficient of the flow channels having thorns amounted to $k = 0.18$ mm$^3$. Under these conditions, the density in the regions of the pins could be further decreased. The pores in these regeions were coarser. The total density of the profile was about 0.55 g/ml. The surface of the profile was as smooth as that in Example 1.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. An apparatus for the production of extruded profiles of foamed thermoplasts consisting essentially of an extruder having an extrusion helix and a form-giving extrusion head having a flow channel there-through, at least part of the length of said flow channel being divided by separating walls having a thickness of 0.2 to 3 mm arranged in the axial direction into individual channels of such a length and flow cross-section area that each individual channel has a nozzle coefficient k of form 0.1 to 2mm$^3$, forming a throttle lattice and thorn-like pins positioned in some of said individual channels to reduce the flow cross-section area of said individual channels.

2. The apparatus of claim 1, wherein the diameter of said thorn-like pins is so chosen that the distance between the surface of the pins and the inner wall of the respective individual channel ranges between 0.2 and 5 mm, whereby the diameter of said thorn-like pins within the extrusion head may vary.

3. The apparatus of claim 1, wherein the length of said thorn-like pins ranges from 0.1 to 1.5 times the length of said individual channel within said throttle lattice.

4. The apparatus of claim 1, wherein said thorn-like pin has a circular cross-section.

5. The apparatus of claim 1, further comprising tie rods for interconnecting said thorn-like pins with each other to position each of said thorn-like pins within said individual channels.

* * * * *